United States Patent
Gutjahr et al.

(10) Patent No.: US 6,513,394 B1
(45) Date of Patent: Feb. 4, 2003

(54) TORQUE SENSOR

(75) Inventors: Jorg Gutjahr, Numbrecht (DE); Wolfgang Porth, Frankfurt (DE); Luther Gier, Bad Nauheim (DE)

(73) Assignee: Siemens VDO Automotive AG, Munich (DE)

( * ) Notice: Subject to any disclaimer, the term of this patent is extended or adjusted under 35 U.S.C. 154(b) by 0 days.

(21) Appl. No.: 09/359,863

(22) Filed: Jul. 26, 1999

(30) Foreign Application Priority Data

Jul. 24, 1998 (DE) ................................ 198 33 359

(51) Int. Cl.$^7$ ................................ G01L 3/14
(52) U.S. Cl. ................................ 73/862.324
(58) Field of Search ............... 73/862.324, 800, 73/862.326, 862.325, 136; 250/231; 128/2

(56) References Cited

U.S. PATENT DOCUMENTS

| | | | |
|---|---|---|---|
| 2,136,223 A | * 11/1938 | Thomas | 265/25 |
| 4,102,052 A | * 7/1978 | Bloch | 33/180 |
| 4,106,492 A | * 8/1978 | Schuette et al. | 128/2 |
| 4,430,566 A | * 2/1984 | Searle | 250/231 |
| 4,433,585 A | * 2/1984 | Levine | 73/862.34 |
| 4,809,557 A | * 3/1989 | Maurer et al. | 73/862.32 |
| 5,247,839 A | * 9/1993 | Okutani et al. | 73/865.326 |
| 5,723,794 A | * 3/1998 | Discenzo | 73/800 |
| 5,747,699 A | * 5/1998 | Ebi | 73/800 |
| 6,068,394 A | * 5/2000 | Dublin, Jr. | 364/508 |

FOREIGN PATENT DOCUMENTS

| | | | |
|---|---|---|---|
| DE | 29 39 531 | 9/1978 | G01L/3/02 |
| DE | 195 02 616 A1 | 1/1995 | G01L/3/14 |
| EP | 0 444 337 A1 | 2/1990 | G08C/23/00 |
| EP | 0 555 987 A2 | 2/1993 | G01L/3/12 |
| JP | 61-176829 A | 8/1986 | G01L/3/08 |
| JP | 63263436 | 10/1988 | G01L/5/22 |
| JP | 4-372830 A | 12/1992 | G01L/3/12 |
| JP | 04372830 | 12/1992 | G01L/3/12 |
| JP | 09015067 A | 1/1997 | G01L/3/10 |

* cited by examiner

Primary Examiner—Hezron Williams
Assistant Examiner—Jewel V. Thompson
(74) Attorney, Agent, or Firm—Mayer, Brown, Rowe & Maw

(57) ABSTRACT

A torque sensor has a housing which has a light source and a measuring shaft which has a signal generator arrangement belonging to a rotation angle sensing device with a processing The rotation angle sensing device is arranged to rotate relative to the housing, together with the measuring shaft, and the processing device has an opto-electric power supply device.

13 Claims, 1 Drawing Sheet

TORQUE SENSOR

BACKGROUND OF THE INVENTION

1. Field of the Invention

The present invention relates to a torque sensor having a housing which has a light source and a measuring shaft which has a signal generator arrangement associated with a rotation angle sensing device with a processor.

2. Description of the Related Art

A torque sensor of this type is disclosed by EP 0 555 987 B1. The known torque sensor is used in a power-assisted vehicle steering system. It is arranged between a steering wheel and a steering gearbox. The wheels are acted on by a motor which is driven in such a way that the torque determined by the torque sensor becomes as small as possible. The measuring shaft is in this case designed as a torsion shaft, that is to say it is rotated or twisted somewhat when a force is applied to the steering wheel. The signal generator arrangement operates optically. It has two diaphragm disks which, when a torque occurs, are rotated in relation to each other. A receiver arrangement receives a greater or lesser luminous flux through the diaphragm arrangement, and accordingly outputs a greater or lesser signal current, from which the torque acting on the measuring shaft can then be calculated.

Another torque sensor is disclosed by EP 0 765 795 A2. This torque sensor also determines the relative position of the two ends of the measuring shaft, specifically by using transfer devices which induce different voltages in different coils.

Problems arise in such torque sensors when the torque is to be determined on a rotable shaft. However, in the case of a steering shaft this is usually the case. The steering wheel has to describe a number of revolutions between the two extreme positions of the steered wheels.

For this reason, in the first-mentioned printed document, only the diaphragm arrangement can be rotated. The light source and the receiver arrangement are fixed to the housing. This requires a relatively complicated construction. In order to transmit the electrical signals with the aid of transfer devices, relatively high amplitudes are necessary, and it likewise necessitates a complicated construction.

One object of the invention is based on being able to determine a torque in a simple way, even on rotating shafts. Other objects and advantages of the present invention will become apparent from the following summary and detailed description of the presently preferred embodiments.

SUMMARY OF THE PRESENT INVENTION

In a torque sensor of the type cited at the beginning, this object is achieved by the rotation angle sensing device being arranged to rotate relative to the housing, together with the measuring shaft, and by the processing device having an opto-electric power supply.

This configuration permits the entire rotation angle sensing device to be arranged to be stationary in relation to the measuring shaft. Consequently, the entire evaluation of the rotation angle sensing can take place directly on the measuring shaft. The risk that interference will be introduced into the signals is relatively low. The electrical power which is necessary to operate the processing device is supplied on an optical path. The power supply device converts the incident luminous flux into an electrical voltage and, if appropriate, conditions this voltage. Since no relatively large amounts of electrical power are usually required for the signal processing in the rotation angle sensing device, the optical power, transmitted with the aid of light, is entirely sufficient.

One end of the measuring shaft is preferably connected to a first carrier, which has an optical detector arrangement, and the other end of the measuring shaft is connected to a second carrier, which has a diaphragm arrangement, the second carrier being arranged between the first carrier and the light source. If a torque is applied, then the measuring shaft is twisted somewhat. Consequently, the two carriers are displaced in relation to each other. The diaphragm arrangement, which is arranged between the light source and the first carrier, accordingly shades certain regions of the optical detector arrangement and exposes others. In this way, a differential signal can be obtained which permits an improved determination of the relative displacement of the two carriers in relation to each other (in the circumferential direction). In this case, it is particularly advantageous that the same light source which is used to obtain the position signal can also be used to supply the electrical power. This simplifies the construction.

The second carrier preferably has a photovoltaic arrangement on its side facing the light source. A photovoltaic arrangement may be formed, for example, by so-called "solar cells", which convert incident light directly into electrical power. Accordingly, no further conversion steps, for example via a heat/force coupling, are required. The solar cells may be formed, for example, by photoelectric semiconductors.

The spectrum of the light source is advantageously matched to the sensitivity of the photovoltaic arrangement. In this way, a high efficiency is achieved. The diaphragm arrangement is preferably formed by at least one aperture in the photovoltaic arrangement and its carrier. Consequently, it is possible to utilize the entire area of the carrier to accommodate the corresponding solar cells. The larger the area which is available to receive light, the more power can be transmitted to the photovoltaic arrangement and therefore to the power supply device.

The processing device preferably has a transmitter which interacts with a receiver in the housing via a wire-free link. The measuring shaft can therefore rotate freely, without any lines needing to be connected to the housing. However, there is a line between the two carriers. Since the relative movement between these two carriers is very small and moves within the range of one degree, it is still possible to operate here with a flexible line. Otherwise, the multiple rotation of the measuring shaft is not impeded by lines.

The wire-free link is preferably designed as an optical transmission link. An optical transmission link has the advantage that it is relatively insensitive to interference which can be introduced from outside. However, such immunity to interference should certainly be provided in the case of a motor vehicle.

The optical transmission link is preferably arranged on that side of the first carrier which faces away from the light source. The optical transmission link is therefore shaded from the light source. This permits the optical transmission link to be provided with a relatively high sensitivity.

The optical transmission link advantageously has a number of receiver elements distributed around the shaft. It is then possible to manage with one or, in any case, a few transmitters, and nevertheless to achieve a reliable transmission of the torque signal values for each rotation angle of the measuring shaft.

In this case, it is particularly preferred for the transmitter to output a frequency-analog, pulse-width modulated or carrier-frequency signal or another amplitude-independent signal. A signal of this type, whose information is carried not in the amplitude but in other variables, can be transmitted with high reliability, the respective distance between the transmitter and the nearest receiver element being unimportant. The influence of interfering light, which may arise, for example, from the light source, can also be kept small.

The light source preferably operates in cycles. Although this reduces the power which can be transmitted, this can be tolerated if the power supply device is designed to be appropriately large. However, the advantage which is achieved in this way is that interfering variables can be filtered out with relatively high reliability. The signal detected by the optical detector arrangement, or the signals determined, generally contain a useful component which depends on the exposure or shading by the diaphragm arrangement, and an interference component. The interference component can be caused by stray light, by parasitic currents or by aging-induced changes in the components. The interference component is independent of the exposure or shading of the photodetector by the diaphragm arrangement. It therefore remains constant even when the light source changes its light intensity. If, therefore, the signals from the optical detector are compared with one another in different phases of a cycle, it is possible to eliminate the corresponding interference components. In a particularly simply configured embodiment, this is the case if the light source transmits no light in one portion of each period. In this case, only the interference signal is produced in this portion, and this can then be removed again in a following portion from the combined interference and useful signals.

In a particularly preferred configuration, provision is made for the measuring shaft to be surrounded by a hollow shaft which bears one of the two carriers, the other carrier being of circular-segment design and projecting through a corresponding slot in the wall of the hollow shaft. This has the advantage that the hollow shaft can be supported on both sides of the measuring shaft. The movement of the hollow shaft in relation to the measuring shaft is then restricted to pure rotation. Consequently, the result is no other displacements of the two carriers in relation to each other. Since one carrier is of circular-segment design, it is able to project through the slot in the hollow shaft without excessively weakening the hollow shaft.

In this case, it is particularly preferred for a pin to be led through that end of the measuring shaft which is not connected to the hollowing shaft, said pin also being plugged into the hollow shaft and being retained in one of the two parts, measuring shaft and hollow shaft, and the opening in the other of the two parts being larger than the cross section of the pin. The pin therefore permits a relative rotation of the hollow shaft in relation to the measuring shaft. The opening only has to be sufficiently large that the pin does not make contact with that part containing the opening at the maximum permissible torques. However, should the torque become greater, then the pin provides security against this greater torque also acting on the measuring shaft. The pin therefore forms an overload safeguard. The designation "pin" is in this case a contraction for an element that satisfies the function described. It may also actually be a rod, for example a cylindrical one. However, it is also possible for a type of ring gear arrangement to be provided, in which the measuring shaft and the sleeve each have ring gears which interengage and are provided with appropriate play in order in this way to absorb the acting forces over the entire circumference.

BRIEF DESCRIPTION OF THE DRAWINGS:

The invention will be described below using a preferred exemplary embodiment in conjunction with the drawings, in which.

DETAILED DESCRIPTION OF THE PRESENTLY PREFERRED EMBODIMENTS

Figure 1:
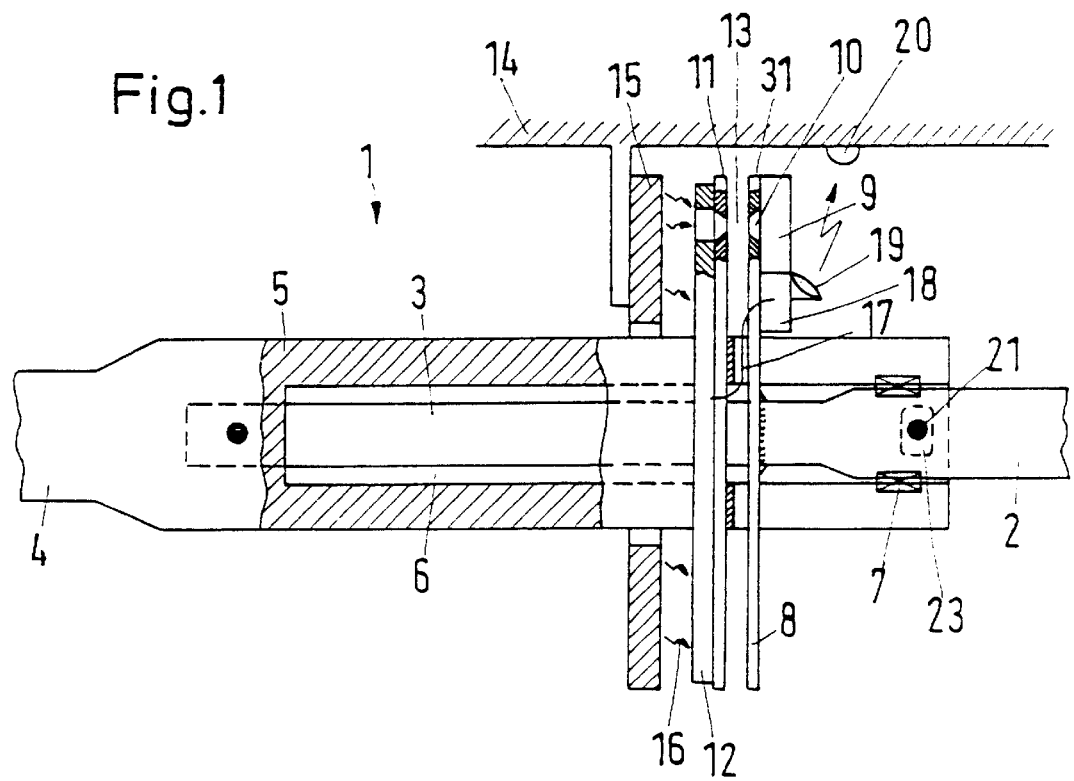
FIG. 1 illustrates a schematic side view of a torque sensor.

A torque sensor 1 is used to determine a torque on a steering shaft. One portion 2 of the steering shaft, which is connected to a steering wheel (not specifically illustrated), is connected via a measuring shaft 3, which is designed as a torsion shaft, to a second portion 4, which is connected to a steering gearbox (not specifically illustrated). If the portion 2 of the steering shaft is rotated, the measuring shaft 3 then transmits the corresponding torque to the portion 4, which rotates accordingly. If the steered wheels are to be moved from one extreme position to the other, then as a rule between three and eight revolutions of the steering shaft are necessary for this.

Fastened to the portion 4 of the steering shaft is a sleeve 5, which is designed as a hollow shaft. The measuring shaft 3 is arranged in the hollow interior 6 of the sleeve 5. The measuring shaft 3 has a diameter which is reduced by comparison with the two portions 2, 4. The sleeve 5 extends over the entire length of the measuring shaft 3 and is supported on the portion 2 of the steering shaft with the aid of bearings 7 on the steering shaft.

Arranged at the other end of the measuring shaft 3, and permanently connected to the end of the measuring shaft 3, is a first carrier 8. The first carrier 8 carries an optical detector arrangement 9, which can be illuminated through a window 10 in the first carrier.

Arranged to the left beside the first carrier is a second carrier 11, which is rotationally fixedly connected to the sleeve 5. On the side facing away from the first carrier 8, the second carrier 11 carries a layer of solar cells 12. Fitted in the second carrier 11 and the solar cells 12 is only one diaphragm 13, which is located opposite the window 10.

Arranged on that side of the second carrier which faces away from the first carrier 8; in a housing 14 in which the steering shaft is also mounted, is a light source 15. The light source 15 is of annular configuration and surrounds the sleeve 5. Consequently, it illuminates the solar cells 12, which is to be indicated by arrows 16. The solar cells 12 are connected via a line 17 to a processing device 18, which has a power supply device (not specifically illustrated). The power supply device conditions the electrical power produced by the solar cells 12 under the action of the light 16, if necessary stores intermediately and stabilizes the voltage.

The processing device 18 has a transmitter 19, which is designed as an optical transmitter. Provided on the housing is a receiver 20, or even better, a number of receivers 20, which are arranged distributed in the circumferential direction around the sleeve 5.

Figure 2:
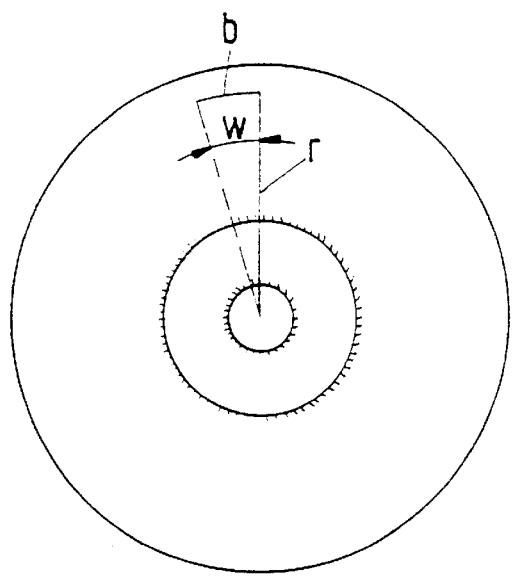
FIG. 2 illustrates a schematic view to explain the determination of torque.

The determination of a torque acting on the steering shaft is now to be explained schematically using FIG. 2. The torque M is proportional to a torsion angle w, that is to say $$M = C \cdot w,$$

where C is a constant which depends on the measuring shaft. Depending on a radius r, the torsion angle w results in a measurement travel b. If now the two portions 2, 4 are rotated in relation to each other because of a prevailing torque, it is possible to measure the measurement travel b. Since small angles of the order of magnitude of 1°, and correspondingly small distances of the order of magnitude of 0.1 mm are usually concerned, it is expedient to carry out the measurement of the travel optically.

The measurement of the travel can now be carried out by the diaphragm 13 being displaced with respect to the detector arrangement 9. By this means, two signals changing in opposite direction may be produced, for example at the output of the detector arrangement 9, and can be evaluated in such a way as is described, for example, in EP 0 555 987 B1 or EP 0 765 795 A2. However, other evaluation options are also conceivable, for example using reflective structures, with the aid of Moire patterns or interferometry. Devices considered for the detector arrangement are light receivers, which can be designed as individual or twin elements or as line sensors (diode fields, CCD).

The illumination needed for the optical sensing originates from the light source 15. At the same time, the light source 15 transmits the power necessary for the evaluation of the signals, specifically in an optical way. In a similar way, measured signals are transmitted with the aid of the transmitter 19, likewise in an optical way. In this case, in principle the single condition is that the optical signal which is transmitted by the transmitter 19 to the receiver 20 or to the receivers does not contain the information in the amplitude. Conceivable signals are, for example, frequency-modulated, frequency-analog, pulse-width modulated or carrier-frequency signals, but it is also possible to transmit the information digitally if an A/D converter is available on the shaft.

As illustrated, the wire-free transmission link between the transmitter 19 and the receiver 20 is largely shaded by the first carrier, so that the light source cannot produce any interference here.

Figure 3:
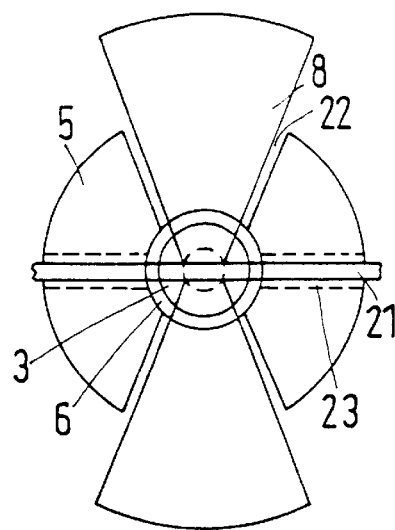
FIG. 3 illustrates a schematic front view of the torque sensor of FIG. 1.

The sleeve 5 is further connected to the portion 2 or that end of the measuring shaft 3 there with the aid of a pin 21, which is plugged firmly into the steering shaft and also passes through the sleeve 5. This can be seen from FIG. 3. FIG. 3 also shows that the first carrier 8 is of circular-segment design. In the present exemplary embodiment, it is formed by two circular segments, which are located diametrically opposite each other. The first carrier 8 is led through a slot 22, which is sufficiently larger than the first carrier 8 that the permissible twisting between sleeve 5 and carrier 8 can be established without the carrier 8 striking the sleeve 5.

It is also possible to see that the opening 23 through which the pin 21 in the sleeve 5 is led is also larger than the cross section of the pin 21. Consequently, the pin 21 is able to move in this opening 23.

However, the movement is limited if the torque prevailing between the two portions 2, 4 exceeds a value which is permitted. In this case, the pin 21, together with the sleeve 5, serves as a torque safeguard in order to prevent damage to the measuring shaft 3.

Instead of the pin illustrated, provision can also be made for the measuring shaft and the sleeve each to have ring gears or other toothed structures, which interengage and are provided with appropriate play, in order in this way to absorb the acting forces over the entire circumference.

What is claimed is:

1. A torque sensor comprising:

a light source, a rotating shaft comprised of first and second rotating members secured to the rotating shaft, the first rotating member having an optical detector and the second rotating member being located between the light source and the optical detector, the second rotating member having a photovoltaic arrangement on its side facing the light source acting as a power supply for a processing device, wherein the light source generates a signal in the optical detector and also drives the photovoltaic arrangement.

2. The torque sensor as claimed in claim 1, wherein a first end of the first rotating member is connected to the optical detector, and the second rotating member is connected to a diaphragm.

3. The sensor as claimed in claim 1, wherein the spectrum of the light source is matched to the sensitivity of the photovoltaic arrangement.

4. The sensor as claimed in claim 2 wherein the diaphragm is formed by at least one aperture in the photovoltaic element.

5. The sensor as claimed in claim 1, further comprising a processor that has a transmitter which interacts with a receiver across a wireless link.

6. The sensor as claimed in claim 5, wherein the wireless link is an optical transmission link.

7. The sensor as claimed in claim 6, wherein the optical transmission link is on a side of the first rotating member which faces away from the light source.

8. The sensor as claimed in claim 6, wherein the optical transmission link has a plurality of receiver elements distributed around the shaft.

9. The sensor as claimed in claim 6, wherein the transmitter outputs a frequency-analog, pulse-width modulated or carrier-frequency signal.

10. The sensor as claimed in claim 1, wherein the light source operates cyclically.

11. The sensor as claimed in claim 10, wherein the light source transmits no light in one portion of each period.

12. The sensor as claimed in claim 1, wherein the second rotating member is comprised of a hollow shaft.

13. The sensor as claimed in claim 12, wherein a pin extends through an end of the first rotating member.

* * * * *